United States Patent
Salman et al.

(10) Patent No.: US 11,558,379 B2
(45) Date of Patent: Jan. 17, 2023

(54) NETWORK ACCESS AUTHENTICATION AND AUTHORIZATION USING A BLOCKCHAIN NETWORK

(71) Applicant: HEWLETT PACKARD ENTERPRISE DEVELOPMENT LP, Houston, TX (US)

(72) Inventors: Mohammed Salman, Santa Clara, CA (US); Rajarao Bhagya Prasad Nittur, Santa Clara, CA (US); Ram Tripathi, Santa Clara, CA (US); Mohit Goyal, Santa Clara, CA (US); Rajesh Kumar Ganapathy Achari, Mumbai (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 818 days.

(21) Appl. No.: 16/511,808

(22) Filed: Jul. 15, 2019

(65) Prior Publication Data
US 2021/0021597 A1     Jan. 21, 2021

(51) Int. Cl.
*H04L 29/06*     (2006.01)
*H04L 9/40*     (2022.01)
(Continued)

(52) U.S. Cl.
CPC ....... *H04L 63/0884* (2013.01); *G06Q 20/065* (2013.01); *G06Q 20/389* (2013.01);
(Continued)

(58) Field of Classification Search
None
See application file for complete search history.

(56) References Cited

U.S. PATENT DOCUMENTS

2017/0310653 A1   10/2017   Zhang
2017/0352027 A1*   12/2017   Zhang ................. G06Q 20/065
(Continued)

FOREIGN PATENT DOCUMENTS

EP           3743844 B1 *   3/2022      ......... G06F 21/6254
WO    WO-2017112019       6/2017
WO    WO-2018223125      12/2018

OTHER PUBLICATIONS

Sebastian Peyrott, An Introduction to Ethereum and Smart Contracts, version 0.1.0, 2017, Auth0 Inc., p. 1-68. (Year: 2017).*
(Continued)

*Primary Examiner* — Jeffery L Williams
(74) *Attorney, Agent, or Firm* — Sheppard Mullin Richter & Hampton LLP (57) ABSTRACT

Some implementations of the disclosure are directed to receiving, at an authentication server system, a distributed ledger address transmitted by a client device to identify itself during an authentication process for accessing a network, where the distributed ledger address corresponds to a distributed ledger network; transmitting an authentication challenge message from the authentication server to the client device; in response to transmitting the authentication challenge message from the authentication server to the client device, receiving at the authentication server, a response to the challenge message including a signature; and using at least the distributed ledger network to determine if the signature used to sign the response to the challenge message is associated with the distributed ledger address transmitted by the client device.

22 Claims, 7 Drawing Sheets

(51) Int. Cl.
*H04L 9/32* (2006.01)
*G06Q 20/06* (2012.01)
*G06Q 20/38* (2012.01)
*H04L 9/00* (2022.01)

(52) U.S. Cl.
CPC ..... *G06Q 20/3825* (2013.01); *G06Q 20/3829* (2013.01); *H04L 9/3247* (2013.01); *H04L 9/3271* (2013.01); *G06Q 2220/00* (2013.01); *H04L 9/50* (2022.05); *H04L 63/0892* (2013.01); *H04L 2209/56* (2013.01)

(56) References Cited

U.S. PATENT DOCUMENTS

| | | | |
|---|---|---|---|
| 2019/0349254 A1* | 11/2019 | Nolan | H04L 61/4505 |
| 2019/0349426 A1* | 11/2019 | Smith | H04L 63/123 |
| 2020/0045051 A1* | 2/2020 | Bathen | H04L 63/20 |
| 2021/0021597 A1* | 1/2021 | Salman | H04L 9/3239 |

OTHER PUBLICATIONS

Blockchain, the Next Authentication Provider? (Web Page), Retrieved Dec. 27, 2018, 4 Pgs, Traxion.

Peyrott, S., An Introduction to Ethereum and Smart Contracts: A Programmable Blockchain, (Web Page), Mar. 28, 2017, 39 Pgs, Auth0.

* cited by examiner

NETWORK ACCESS AUTHENTICATION AND AUTHORIZATION USING A BLOCKCHAIN NETWORK

DESCRIPTION OF THE RELATED ART

Authentication, Authorization, and Accounting (AAA) generally refers to network security services that are used to manage user access to a network. Authentication may refer to the method of identifying a user accessing a network. Generally, a user may be identified by credentials that may take the form of a username and password, a digital certificate, a biometric scan, some combination thereof, etc. Authorization may refer to network access privileges that are provided to an identified user. Authorization may determine what a user can and cannot do. For example, authorization may determine a user's access to the network based on geographical location or time of day, an amount of bandwidth that is allocated to the user, what virtual local area network (VLAN) the user is allowed to access, what network services or resources the user may access, etc. Accounting may refer to keeping a record of the user's activities on the network. This may include, for example, the services or resources accessed by the user, the times the user logged on and off, the amount of data accessed or transferred by the user, etc. Traditionally, authentication and authorization in a AAA protocol may be performed through centralized data sources such as Active Directory, LDAP or SQL based sources.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments.

The figures are not exhaustive and do not limit the present disclosure to the precise form disclosed.

DETAILED DESCRIPTION

As used herein, the term "distributed ledger" generally refers to a shared digital ledger that is decentralized and shared between nodes distributed across a network. After a transaction that is approved to be written to the ledger is consented by at least the majority of the nodes, the contents of the ledger are synchronized across all the nodes. Different types of consensus mechanisms that bring in varying levels of processing requirements to agree on a transaction amongst distributed nodes may be utilized in a distributed ledger network. Examples of common consensus mechanisms include proof of work, proof of stake, proof of elapsed time, Kafka, etc. Various platforms have adopted different consensus mechanisms.

Distributed ledger technology (DLT) describes the superset of the different variations of this technology. One presently popular type of DLT is blockchain technology. While in a distributed ledger a transaction is written to the ledger after consensus, the requirement is more specific in a blockchain: transactions are aggregated in to a block and the block is appended to the last block of an existing linear chain of blocks. As such, all blockchains are a form of a distributed ledger, but all distributed ledgers are not necessarily a blockchain. BITCOIN and ETHEREUM are examples of blockchain-based platforms. Directed acyclic graphs (DAG) are another example of a common form of DLT. IOTA is an example of a DAG-based platform. HYPERLEDGER is an example of a DLT-based platform. Unless explicitly stated otherwise, implementations of the disclosure may apply to any variant of DLT, including blockchains, DAGs, etc., in a public, private, and/or hybrid networking environment.

Although embodiments of the disclosure will be primarily described in the context of blockchains, it should be appreciated that all embodiments, unless expressly stated otherwise, may be applied to other variants of distributed ledger technology. For example, to the extent an embodiment is described in the context of a blockchain network sharing a blockchain, it should be appreciated that the embodiment may more generally be applied in a distributed ledger network sharing a distributed ledger. Similarly, to the extent that an embodiment recites a "blockchain address," "a blockchain application," or "a blockchain transaction," it should be appreciated that the embodiment may more generally be applied using a "distributed ledger address," "a distributed ledger application," and/or "a distributed ledger transaction."

As used herein, the term "blockchain address" refers to an identifier for a respective receiver or a sender in a blockchain recorded transaction. For example, a unique blockchain addresses may be associated with a client.

As used herein, the terms "off-chain" and "off-chain transaction" refer to transactions that do not occur within a blockchain.

As used herein, the term "smart contract" refers to self-executing code residing on a blockchain network, which automates execution of contracts between trusted parties based on events on a blockchain or distributed ledger.

As used herein, the term "blockchain wallet" refers to a digital wallet that helps manage a user's blockchain account(s), including private and public keys associated with the identity owning the wallet. For example, in particular implementations, a blockchain wallet may be to manage cryptocurrency accounts.

As noted above, traditional authentication and authorization in a AAA protocol is performed through centralized data sources. Implementations of the disclosure are directed to leveraging distributed ledger networks to provide a novel way to authenticate and authorize client devices for network access.

In accordance with a first set of implementations, a client may be authenticated for network access by using an authentication server to authenticate the client using the client's blockchain address that is persisted in a blockchain network. In such embodiments, the authentication server may participate as a validator node in the blockchain network. The client may not be required to carry any transaction on the blockchain network for the purpose of authentication.

In accordance with a second set of implementations, a client having a blockchain address may be authorized for differentiated levels of network access using a smart contract deployed on a blockchain network. In such embodiments, the client may be authorized for receiving network access services based on an amount of cryptocurrency pledged by the client for that purpose. Particularly a client that wishes to use network services may pledge the amount of cryptocurrency that the client wants to set aside for that purpose by invoking an appropriate method in the smart contract deployed on the blockchain network.

Figure 1:
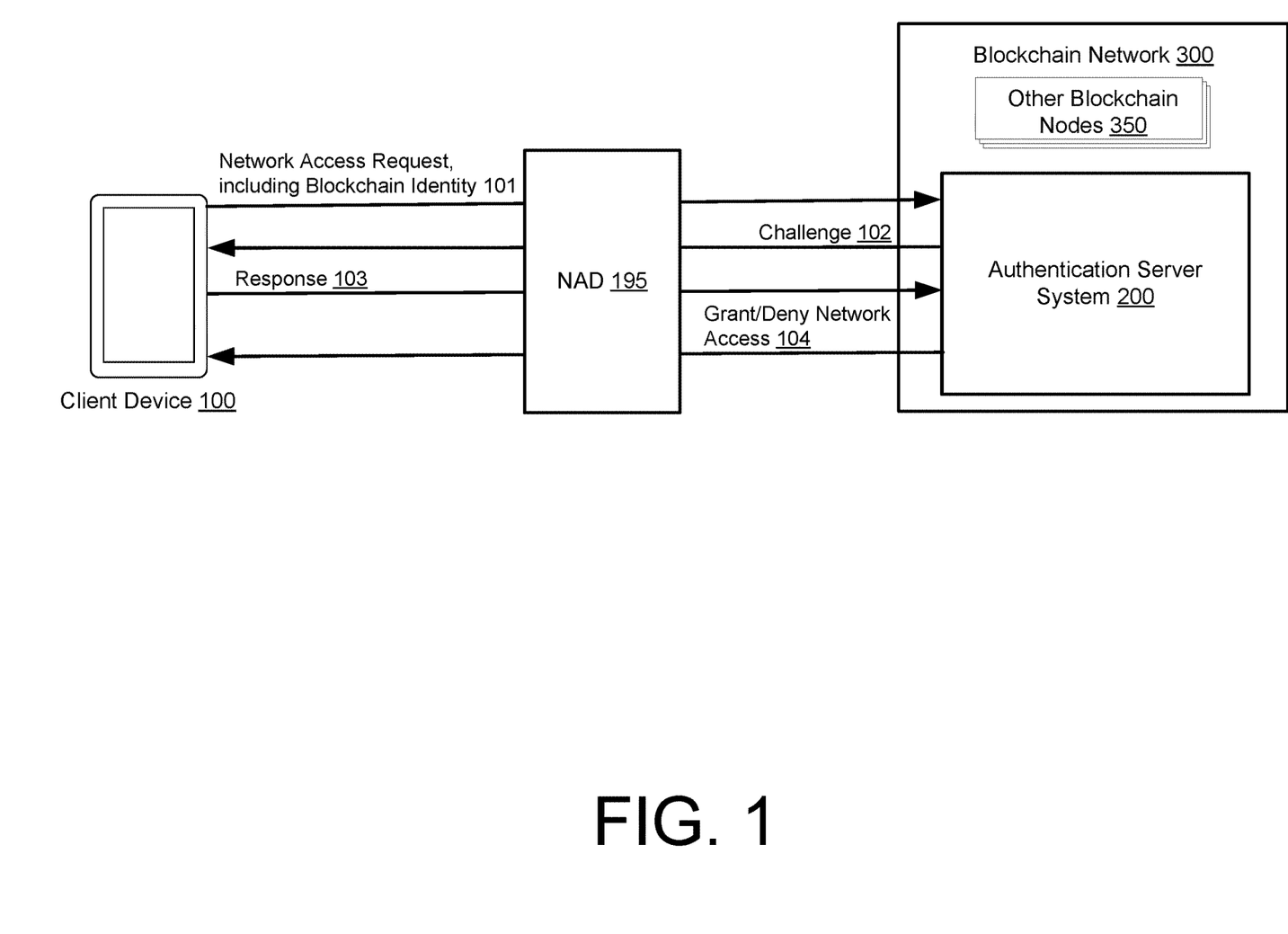
FIG. 1 is a diagram illustrating an example environment in which embodiments of the disclosed technology may be implemented to provide authentication of a client having a blockchain address, in accordance with implementations of the disclosure.

FIG. 1 is a diagram illustrating an example environment in which embodiments of the disclosed technology may be implemented to provide authentication of a client having a blockchain address, in accordance with implementations of the disclosure. In this example environment, authentication server system 200 may provide authentication of client devices (e.g., client device 100) that access a network. Additionally, authentication server system 200 may provide authorization and/or accounting of client devices that access the network. For example, authentication server system 200 may provide AAA in accordance with a RADIUS protocol or a Diameter protocol.

Authentication server system 200 may be used to control access by a client device 100 to various types of wired and wireless networks, including: wireless networks including wireless access points, virtual private networks (VPNs), dial-up networks, etc. For example, authentication server system 200 may be used to support ISPs with modems in computers to connect to a central database, to provide a global set of credentials to be used on a public network, to provide credentials to users of an enterprise or campus, to provide enterprise wireless security with 802.1X authentication, etc. In implementations, server system 200 may implemented using a desktop computing device, an access point with an embedded RADIUS or other AAA protocol server functionality, a router with embedded AAA protocol server functionality, or some other device that may function as an AAA server.

A client device 100 may be any networked device that is provisioned a blockchain address and accesses a network that has access managed by an authentication server system 200. As illustrated in FIG. 1, client device 100 may be a mobile device such as a smartphone, tablet, or laptop computer. In other implementations, client device may be implemented as a wearable device (e.g., smartwatch or head mounted display (HMD) device), a desktop computer, a vehicle, etc.

Network access device (NAD) 195 may be configured to provide an entry point to the network for a client device 100 accessing the network. To this end, NAD 195 may communicate with authentication server system 200 to carry out the process of verifying the identity of a client associated with client device 100. For example, the NAD 195 and authentication server system 200 may communicate through a RADIUS protocol that transports EAP messages between the client and the authentication server. In implementations, NAD 195 may be a wireless access point, a network access server that supports VPN remote access services or dial-up, a switch, a router, or some other device that provides an entry point to the network for a client device 100.

As further discussed below, the authentication server system 200 may authenticate the client using the client's blockchain identity that is persisted on the blockchain network 300. The authentication server system 200 may be configured to participate in the blockchain network 300 as a validator node. Advantageously, in the proposed system, the client associated with client device 100 may not require any network connectivity during authentication. Additionally, the client may not be required to carry out any transaction on the blockchain network for the purpose of authentication.

Blockchain network 300 may include a plurality of nodes (e.g., authentication server system 200 and other blockchain nodes 350 and other components as needed depending on the type of blockchain implementation) that may validate transactions used to prove the identity of a client device for authentication purposes. Some or all blockchain nodes may store a respective copy of a blockchain that contains a chronologically ordered, back-linked list of blocks, including the aforementioned transactions. In some implementations, nodes on blockchain network 300 may be able to write transactions, but not verify transactions. It should be appreciated that although a single authentication server system 200 is illustrated in the example of FIG. 1, other blockchain nodes 350 may also operate as an authentication server. Blockchain network 300 may be implemented as a consortium blockchain network.

Figure 2:
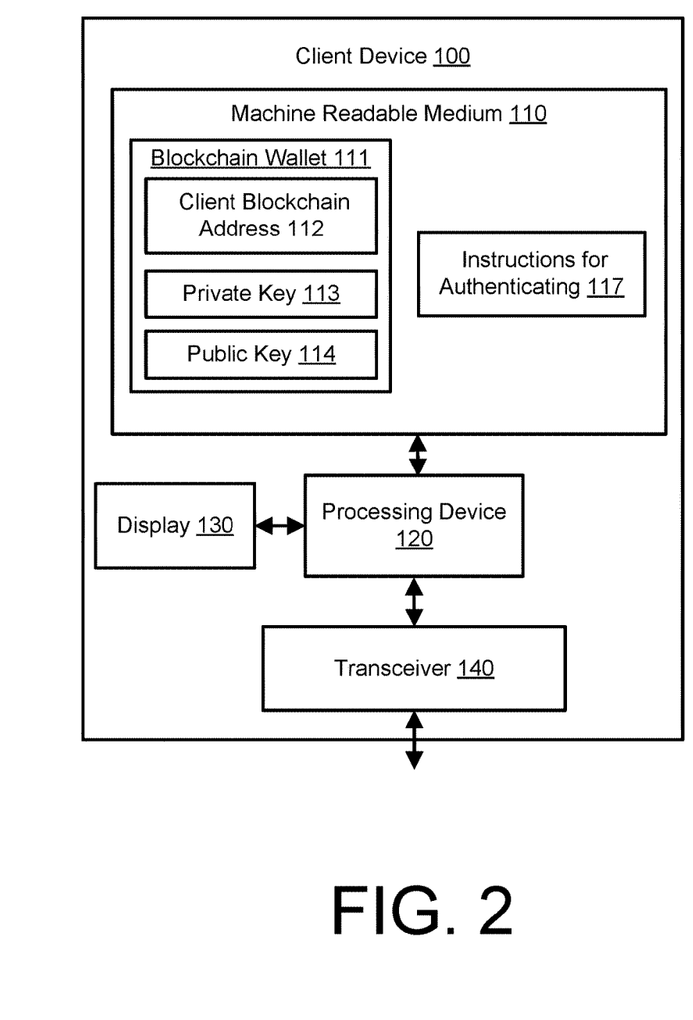
FIG. 2 is a block diagram illustrating an example architecture of components of a client device, in accordance with implementations of the disclosure.

FIG. 2 is a block diagram illustrating an example architecture of components of a client device 100, in accordance with implementations of the disclosure. A client device 100 may include a machine readable medium 110, a processing device 120, a display 130, and a transceiver 140. Transceiver 140 may to receive communications from and/or transmit communications to NAD 195 (e.g., as part of a process of authenticating and/or accessing a network after authenticating). In some cases, instead of using a transceiver 140, separate transmitter and receiver devices may be used.

Machine readable medium 110 of client device 100 may include a blockchain wallet 111. The blockchain wallet 111 may store the client's blockchain address 112 as provisioned on the blockchain network 300. Additionally a public key 114 and private key 113 corresponding to the client's blockchain address 112 may be stored. For example, a public key 114 may be derived from the private key 113, and the client's blockchain address 112 may be derived from the public key 114 by applying additional cryptographic algorithm(s). In some implementations, public key 114 and blockchain address 112 are the same, in which case machine readable medium 110 may store private key 113 and blockchain address 112 without storing public key 114 separately. In some implementations, blockchain wallet 111 may be a subcomponent of a blockchain application (not shown).

Machine readable medium 110 may also store instructions 117, that when executed by a processing device 120, enable the client device 100 to authenticate in accordance with implementations described herein. For example, as part of an authentication process, further described below, the client device 100 may provide blockchain address 112 to NAD 195 and sign a response message using private key 113.

Figure 3:
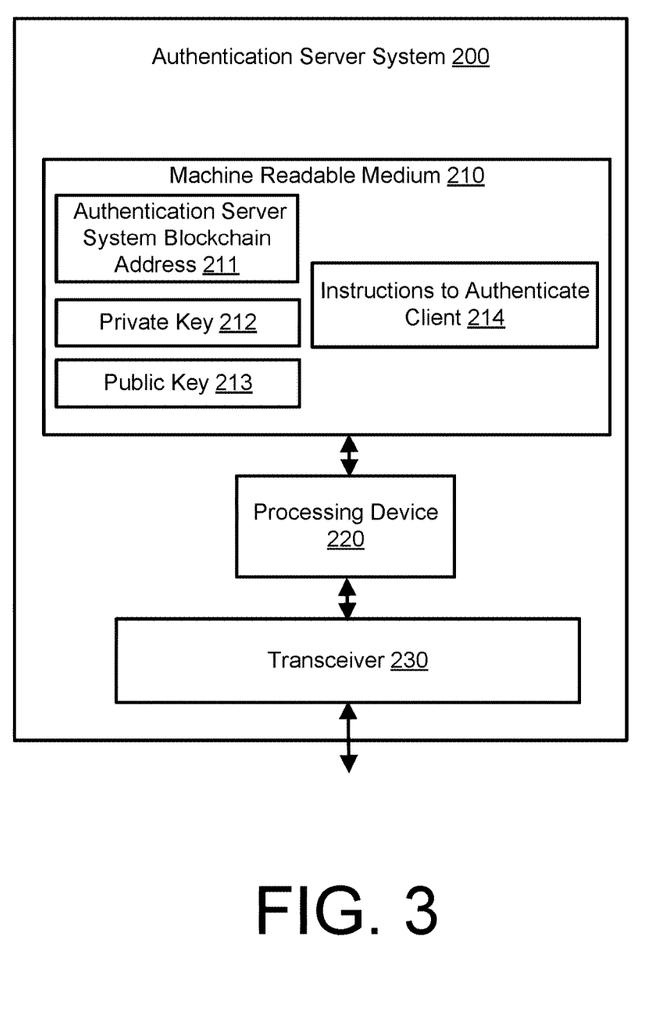
FIG. 3 is a block diagram illustrating an example architecture of components of an authentication server system, in accordance with implementations of the disclosure.

FIG. 3 is a block diagram illustrating an example architecture of components of an authentication server system 200, in accordance with implementations of the disclosure. An authentication server system 200 may include a machine readable medium 210, a processing device 220, and a transceiver 230.

Machine readable medium 210 may store a blockchain address 211 corresponding to the authentication server system, and a private key 212 and public key 213 corresponding to the blockchain address 211. Machine readable medium 210 may also store instructions 214, that when executed by a processing device 220, authenticate a user of client device 100 in accordance with implementations of the disclosure. Transceiver 230 may be to communicate with client device 100 (e.g., via NAD 195). Transceiver 230 may also be to communicate with the blockchain network 300 as part of the process of verifying the identity of the user of client device 100 during authentication.

Figure 4:
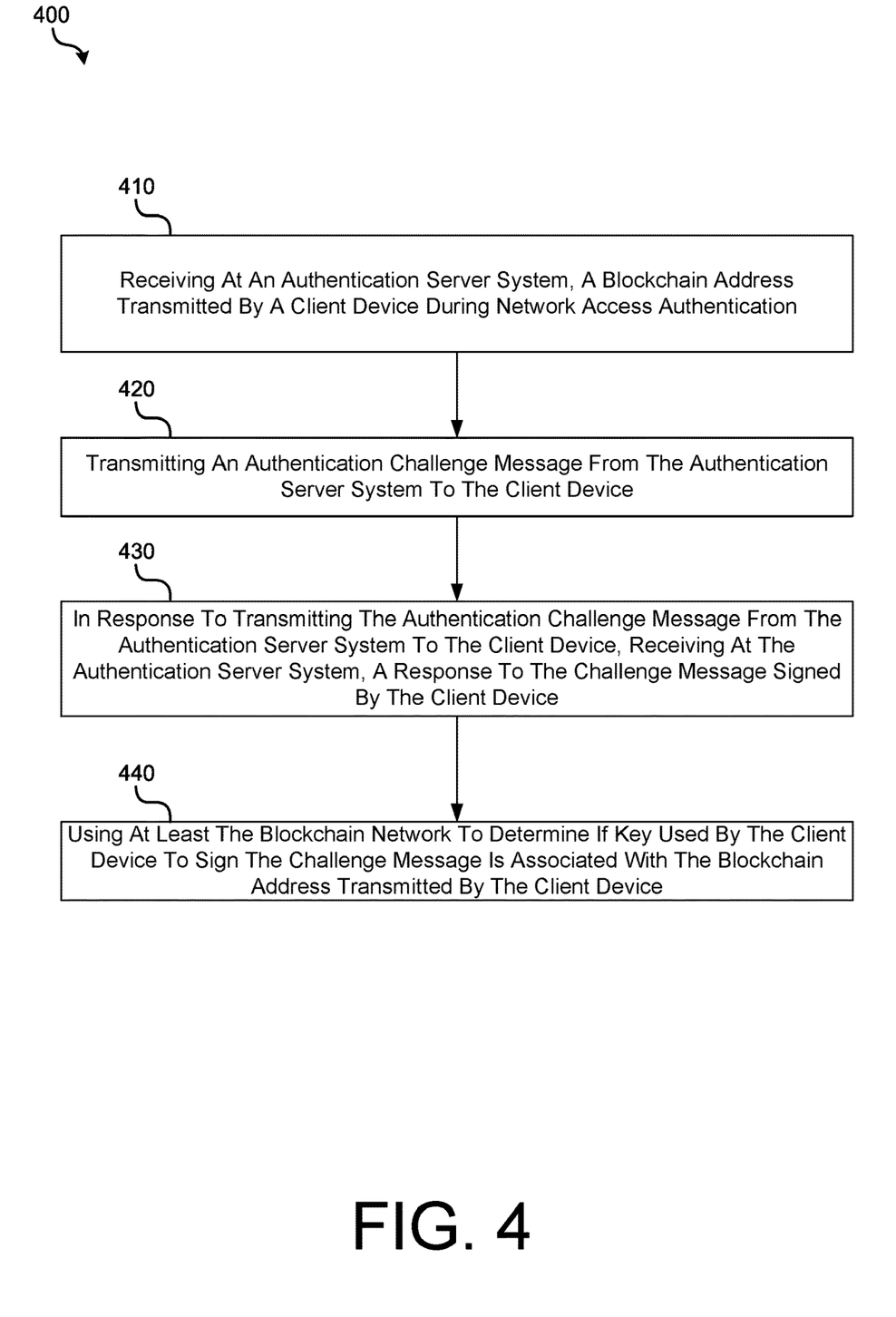
FIG. 4 is an operational flow diagram illustrating an example method that may be implemented by an authentication server system to authenticate a client device, in accordance with implementations of the disclosure.

FIG. 4 is an operational flow diagram illustrating an example method 400 that may be implemented by an authentication server system 200 to authenticate a client device 100, in accordance with implementations of the disclosure. For example method 400 may be implemented by processing device 220 of authentication server system 200 executing instructions 214. Prior to implementing method 400, the client device 100 may initiate a network access authentication attempt with the NAD 195. As such, it should be noted that the NAD 195 may mediate communication between the client device 100 and the authentication server system 200 (e.g., using EAP over RADIUS) during the operations of method 400. Alternatively, authentication server system 200 may directly communicate with client device 100 during method 400. For example NAD 195 may be directly integrated into authentication server system 200.

At operation 410, the authentication server system 200 receives a blockchain address transmitted by the client device 100 during network access authentication, the blockchain address corresponding to a blockchain network. For example, device 100 may provide a stored client blockchain address 112 in conjunction with network access request 101 as its identity for authentication purposes. In various implementations, the device client device 100 provides only blockchain address 112 as the identity for the purpose of network access authentication. In other implementations, client device 100 may provide blockchain address 112 in addition to a centralized identity. For example, the client device 100 may provide user credentials (e.g., username and password) in addition to blockchain address 112. The user credentials may correspond to credentials stored in a centralized database managed off-chain by server system 200.

At operation 420, an authentication challenge message is transmitted from the authentication server system 200 to the client device 100. For example, a challenge message 102 as depicted in FIG. 1 may be transmitted. The challenge message may be transmitted after negotiating a challenge/response based authentication scheme such as a challenge-handshake authentication protocol (CHAP) between client device 100 and authentication server system 200. In some implementations, this may run inside a tunneled authentication method such as the Protected Extensible Authentication Protocol (PEAP) or Tunneled Transport Layer Security (TTLS) for additional secrecy and privacy.

The authentication challenge message may include a randomly generated string. The client device 100 may respond by creating a response message including a signature created using private key 113 associated with the client blockchain address 112. For example, a signature may be created by using the private key 113 to apply a hash function to the randomly generated string or the randomly generated string and a secret value. The response message may include the hash value and the randomly generated string.

At operation 430, in response to transmitting the authentication challenge message from the authentication server 200 to the client device 100, the authentication server 200 receives a response to the challenge message including the signature. For example, a response 103 as depicted in FIG. 1 may be transmitted. As discussed above, the signature may be created using the private key 113 of the client device 100 associated with client blockchain address 112.

At operation 440, the authentication server system 200 uses at least the blockchain network 300 to determine if the signature used to sign the response to the challenge message is associated with the blockchain address transmitted by the client device. For example authentication server system 200 may use blockchain network 300 to determine if the private key used by the client device to sign the challenge message (e.g., private key 113) is associated with the blockchain address (e.g., blockchain address 112) transmitted by the client device by attempting to verify the signed response to the challenge message using a public key (e.g., public key 114) corresponding to the blockchain address. Given the response message, the signature, and retrieved public key, authentication server system 200 may determine the authenticity of the response. As part of this verification, authentication server system 200 may retrieve the public key from the blockchain network 300. Alternatively, the authentication server system 200 may comprises a data store of public keys associated with blockchain network 300. The authentication server system 200 being a node on blockchain network 300 may enable it to act as a transaction validator, including validating authentication requests and authorization requests for service, further discussed below.

Upon successful validation of the signature, the authentication server 200 may deem the authentication as successful and allow network access to the client device 100. Alternatively, if the signature is not successfully validated, the authentication server 200 may not allow the client device 100 to access the network. For example, as depicted by FIG. 1, depending upon whether the signature was successfully validated, a grant/denial of network access 104 may occur. The NAD 195 may enforce this authentication determination.

Figure 5:
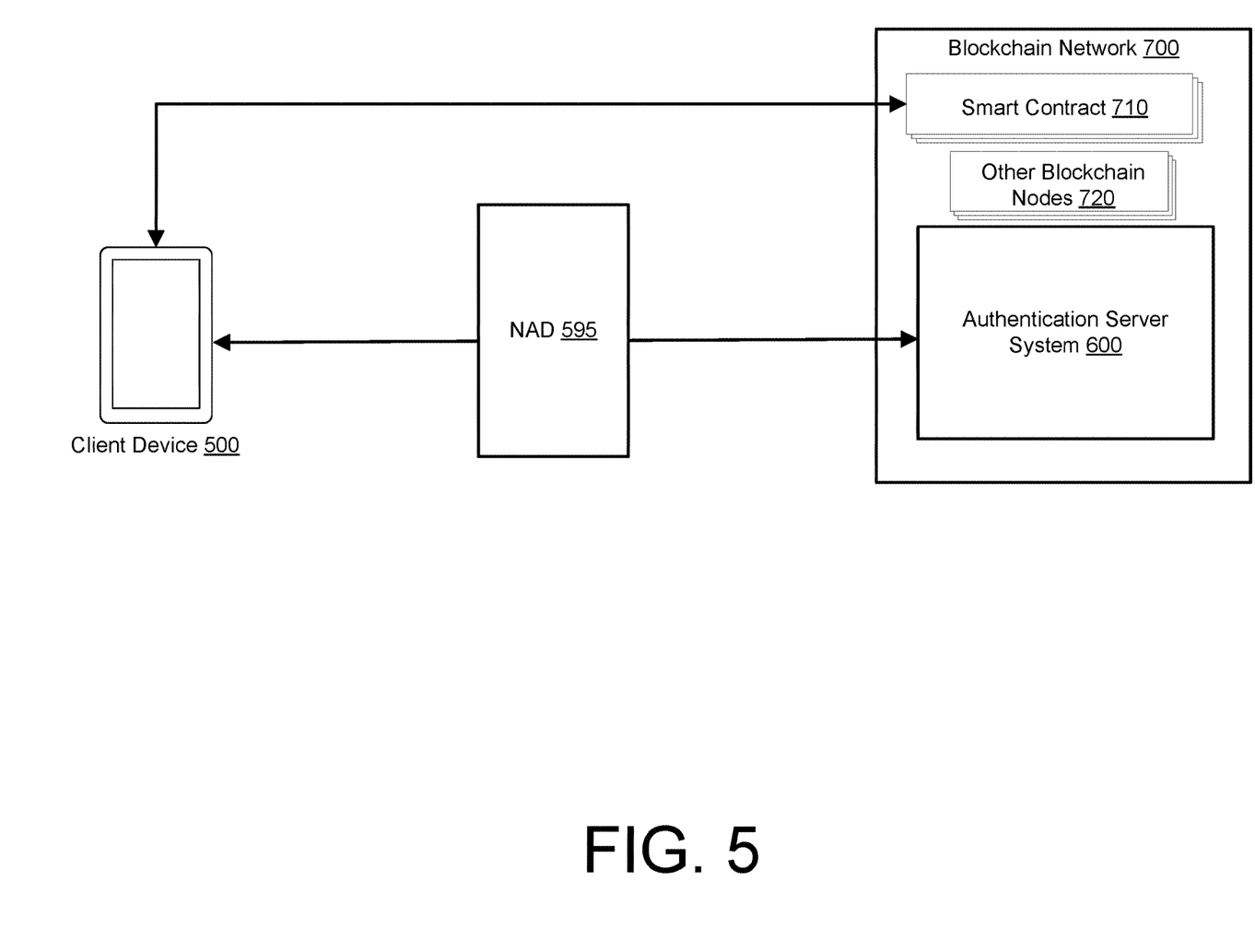
FIG. 5 is a diagram illustrating an example environment in which embodiments of the disclosed technology may be implemented to use a smart contract to provide authorization of a client having a blockchain address, in accordance with implementations of the disclosure.

FIG. 5 is a diagram illustrating an example environment in which embodiments of the disclosed technology may be implemented to use a smart contract to provide authorization of a client having a blockchain address, in accordance with implementations of the disclosure. In this example environment, authentication server system 600 may provide authentication and authorization of client devices (e.g., client device 500) that access a network. Additionally, authentication server system 600 may provide accounting of client devices that access the network. For example, authentication server system 600 may provide AAA in accordance with a RADIUS protocol or a Diameter protocol.

In some implementations, the environment of FIG. 5 may be the same as the environment of FIG. 1. For example, client device 500 may be authenticated by authentication server system 600 in the same manner discussed above with reference to FIGS. 1-4, and NAD 595 may communicate with client device 500 and authentication server system 600 in a similar manner as discussed above with reference to NAD 195. Additionally, blockchain network 700 may be the same as blockchain network 300. It should be appreciated, however, that the authorization techniques described herein with reference to FIGS. 5-8 may be implemented following other methods of authenticating a client device.

In this example environment, a smart contract 710 is deployed on blockchain network 700 to facilitate the provisioning of differentiated levels of network access services to the client device 500 during a network authorization process by the authentication server system 600. Client device 500 may be any networked device that is provisioned a blockchain address and accesses a network that has access managed by an authentication server system 600. Although network authorization of a single client is illustrated in the example environment of FIG. 5, it should be appreciated that in some implementations a smart contract 710 may be used to facilitate the provisioning of network access services to multiple clients.

Figure 6:
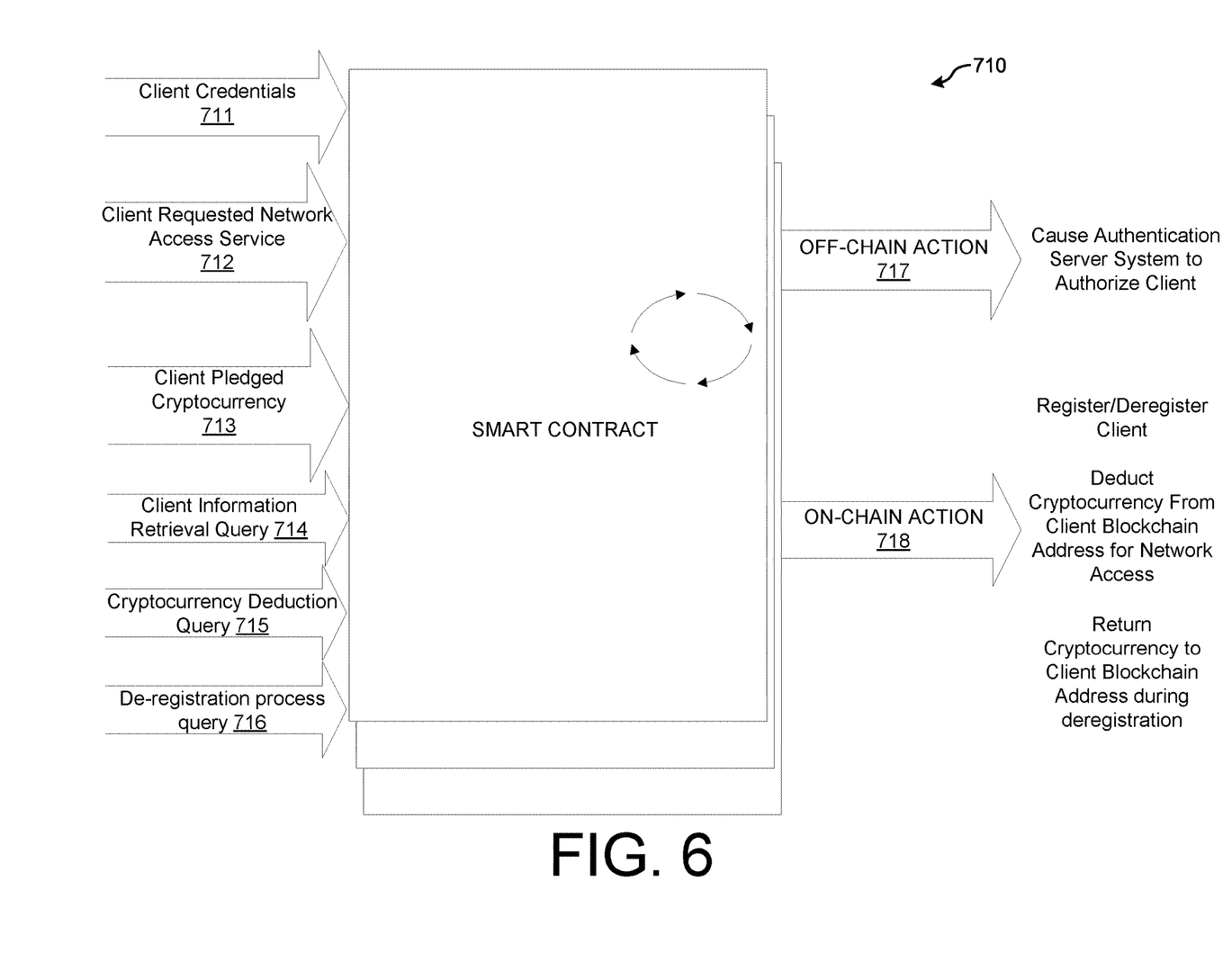
FIG. 6 depicts a simplified representation of the operation of a smart contract that may be deployed on blockchain network to facilitate provisioning of differentiated levels of network access services to a client device, in accordance with implementations of the disclosure.

Smart contract 710 may be deployed on blockchain network 700 by a network service provider that manages authentication server 600 and/or NAD 595. FIG. 6 depicts a simplified representation of the operation of smart contract 710 that may be deployed on blockchain network 700 to facilitate provisioning of differentiated levels of network access services to a client device, in accordance with implementations of the disclosure. Smart contract 710 may be replicated across each copy of a blockchain stored by a permissioned node on blockchain network 700. For example, authentication server 600 and other blockchain nodes 720 may each store a copy of a blockchain including an instance of smart contract 710.

In this example, execution of code contained in the smart contract 710 may be triggered by a variety of inputs that may be received from client device 500 or permissioned nodes 720 (e.g., authentication server system 600) operating on blockchain network 700. For example, during a registration process, the smart contract may receive the client's credentials 711 that it uses for network authentication (e.g., username, password) and a blockchain address associated with the client (e.g., stored in a blockchain wallet). In some implementations, the client device may invoke an appropriate registration method with the smart contract 710 and provide these inputs (credentials and blockchain address) to the smart contract. As part of the registration process, the client may also specify a level of network access service 712 that the client requires and may be used during network authorization. For example, the client may specify a certain bandwidth tier (e.g. "Basic," "Premium," "Plus," etc.) of network access service and/or amount of data to access for a given time period.

Further, the client may pledge an amount of cryptocurrency 713 associated with the client's blockchain address that the client sets aside for the purpose of network authorization. For example, depending on the amount of cryptocurrency pledged, the client may have access to varying levels of service. The pledged cryptocurrency 713 may be transferred and recorded on blockchain network 700. A client device 500 may also initiate a de-registration process query 716 with smart contract 710 whereby any remaining cryptocurrency that was pledged but not consumed during network access may be transferred back to the client device 500 and recorded on the blockchain network 700. In implementations, the client may deregister in the smart contract 710 at any time, and disconnect from and an authentication server system 600. After the client has deregistered, the server may fail any further re-authorization attempts beyond the time for which the cryptocurrency has been deducted.

An authentication server system 600 operated by a network service provider may initiate a query 714 to the smart contract 710 to retrieve the information set in the smart contract 710 against the blockchain address used by the client during the aforementioned registration process by the client. In some implementations, the authentication server system 600 may invoke the appropriate method in the smart contract 710 for this information retrieval process. An authentication server system 600 may also initiate a query 715 to deduct cryptocurrency pledged by the client for providing network access services according to the level requested by the client during the registration process discussed above. In some implementations, the authentication server system 600 may invoke the appropriate method in the smart 710 for this process for consuming the pledged cryptocurrency.

Upon execution of the code, smart contract 710 may perform certain on-chain actions 718 (e.g., register or deregister the client, deduct cryptocurrency from the client blockchain address for network access, return remaining cryptocurrency to the client blockchain address during deregistration) and/or perform certain off-chain actions 717 (e.g., cause authentication server system to authorize the client based on query 714) as discussed above.

Figure 7:
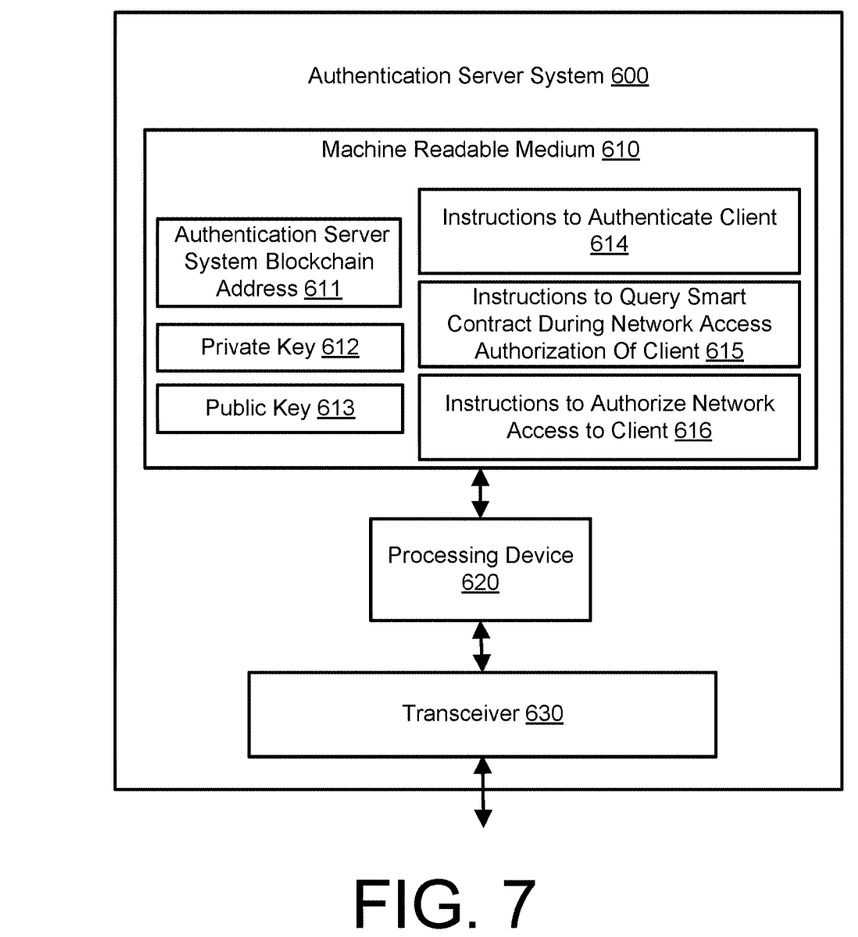
FIG. 7 is a block diagram illustrating an example architecture of components of an authentication server system, in accordance with implementations of the disclosure.

FIG. 7 is a block diagram illustrating an example architecture of components of an authentication server system 600, in accordance with implementations of the disclosure. An authentication server system 600 may include a machine readable medium 610, a processing device 620, and a transceiver 630.

Machine readable medium 610 may store a blockchain address 611 corresponding to the authentication server system, and a private key 612 and public key 613 corresponding to the blockchain address 611. Machine readable medium 610 may also store instructions 614, that when executed by a processing device 620, authenticate a user of client device 500. For example, authentication may proceed as discussed with reference to FIG. 4. Machine readable medium 610 may further store instructions 615 to query smart contract 710 during network access authorization of client device 500. For example, the instructions may implemented to initiate queries 714 or 715 as discussed above. Machine readable medium 610 may further store instructions 616 to authorize (or deny) network access to the client. For example, depending on the smart contract's response to the query, server system 600 may authorize or deny a certain level of network access to the client device 500. Transceiver 230 may be to communicate with client device 500 (e.g., via NAD 595). Transceiver 230 may also be to communicate with the blockchain network 700.

Figure 8:
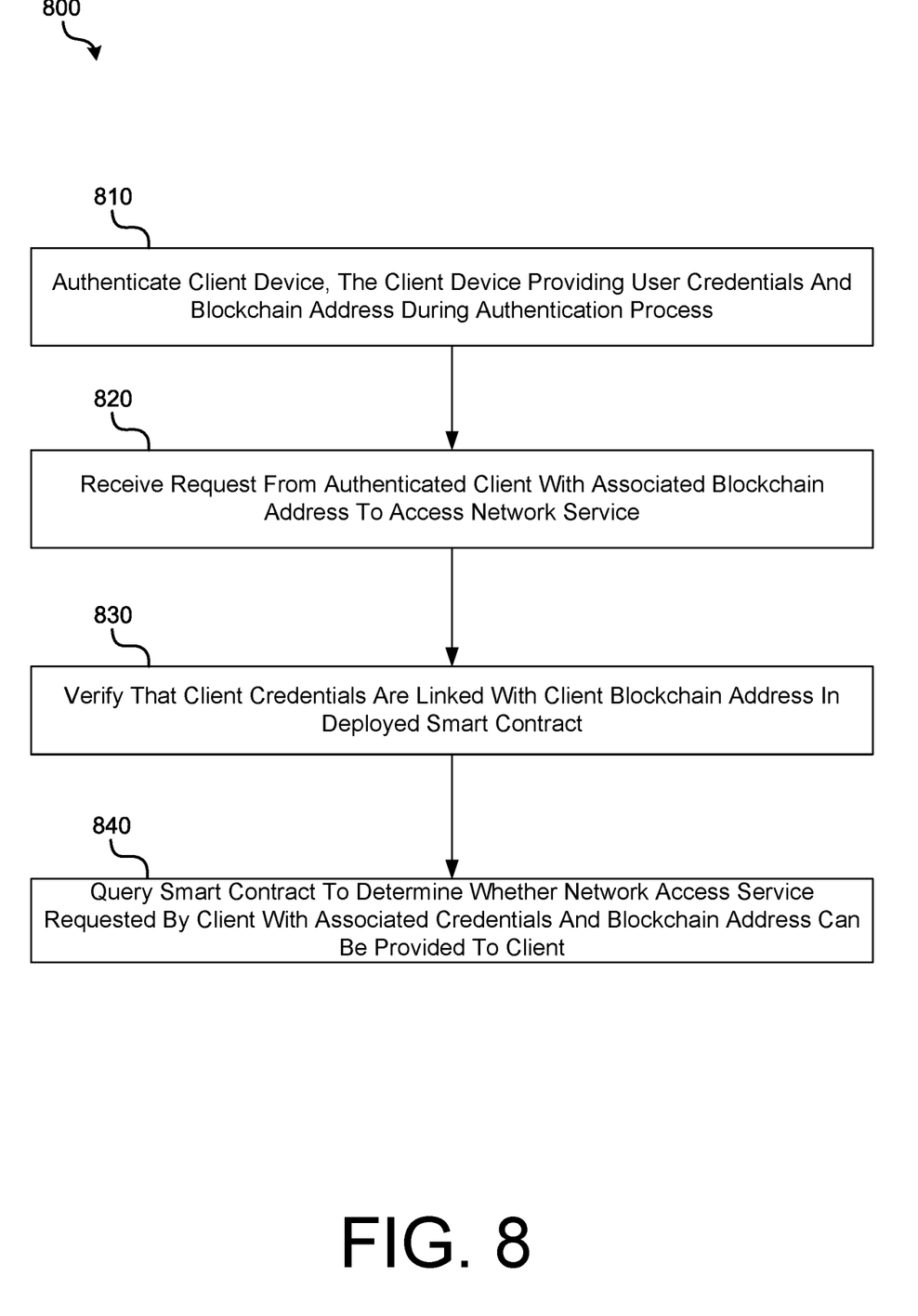
FIG. 8 is an operational flow diagram illustrating an example method that may be implemented by an authentication server system to query a deployed smart contract to authorize network access to a client device, in accordance with implementations of the disclosure.

FIG. 8 is an operational flow diagram illustrating an example method 800 that may be implemented by an authentication server system 600 to query a deployed smart contract 710 to authorize network access to a client device 500, in accordance with implementations of the disclosure. For example method 800 may be implemented by processing device 620 of authentication server system 600 executing instructions 614, 615, and/or 616.

At operation 810, the authentication server system 600 may authenticate client device 500. During this authentication process, the client device 500 may provide user credentials and a blockchain address owned by the client. In some implementations, the blockchain address may be provided as a prefix or suffix of the user credentials (e.g., username, password) or as a vendor specific attribute in the authentication method if the implemented authentication method supports it. Client device 500 or some other device managed by the client may be used to register the client with smart contract 710 by providing the client credentials, blockchain address, requested level(s) of network services, and a pledged amount of cryptocurrency as discussed above.

At operation 820, authentication server system 600 receives a request from authenticated client device 500 to access a network service. As discussed above, during authentication the client device 500 may provide client credentials and a blockchain address owned by the client. At operation 830, the authentication server system 600 verifies that client credentials are linked with the provided client blockchain address in the smart contract 710 deployed on the blockchain network 700. The authentication server system 600 may query the smart contract 710 for this information. At operation 840, the authentication server system 600 may query the smart contract 710 to determine whether the network access service requested by the client associated with the credentials and blockchain address can be provided to the client. For example, authentication server system 600 may retrieve information persisted in the smart contract 710 by the client regarding the level of network access service required and the amount of cryptocurrency pledged, and verify whether the requested service can be provided to the client.

After verifying that the requested level of service may be provided to the client, the authentication server system 600 may query the smart contract 710 to deduct the required cryptocurrency to provide the required network access service. For example, network access may be provided for a stipulated amount of time. Network access may be enforced by NAD 595. Thereafter, the authentication server system 600, as part of an enforcement profile, may instruct the NAD 595 to reauthenticate the client after a stipulated amount time or before during which the authentication server may use smart contract 710 to reauthorize the client and deduct cryptocurrency as needed. This process may iterate until the client deregisters from the smart contract or runs out of pledged cryptocurrency sufficient to support the requested network access.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

In this document, a "server system" may refer to a system of one or more servers.

As described herein, client devices, server systems, beacon devices, asset tags, and sensor devices may implement some or all of their components within a trusted execution environment.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
receiving, at an authentication server system, a distributed ledger address transmitted by a client device to identify itself during an authentication process for accessing a network, wherein the distributed ledger address corresponds to a distributed ledger network;
transmitting an authentication challenge message from the authentication server to the client device;
in response to transmitting the authentication challenge message from the authentication server to the client device, receiving at the authentication server, a response to the challenge message including a signature,
wherein the signature is created using a private key to apply a hash function to a randomly generated string, and
wherein the response includes the signature and the randomly generated string; and
using at least the distributed ledger network to determine if the signature used to sign the response to the challenge message is associated with the distributed ledger address transmitted by the client device.

2. The method of claim 1, wherein using at least the distributed ledger network to determine if the signature used to sign the response to the challenge message is associated with the distributed ledger address transmitted by the client device, comprises: attempting to verify the signature using a public key corresponding to the distributed ledger address, wherein the public key is retrieved from the distributed ledger network.

3. The method of claim 2, further comprising:
if the signature is verified using the public key, the authentication server system providing the client device access to the network; and
if the signature is not verified using the public key, the authentication server system denying the client device access to the network.

4. The method of claim 3, further comprising: after authentication:
receiving a request from the client device to access a network service; and
verifying at the authentication server that credentials provided by the client device during authentication are linked with the distributed ledger address in a smart contract deployed on the distributed ledger network.

5. The method of claim 4, further comprising: the authentication server system querying the smart contract to determine whether the network access service requested by the client device associated with the credentials and distributed ledger address can be provided to the client device.

6. The method of claim 5, wherein the smart contract comprises data including an amount of cryptocurrency pledged by a user of the client device, wherein in response to the query from the authentication server system, the smart contract determines whether a sufficient amount of the pledged cryptocurrency is available to provide the requested network access service.

7. The method of claim 6, further comprising:
the authentication server system querying the smart contract to deduct the amount of cryptocurrency required to provide the requested network access service; and
the authentication server system providing the requested network access service to the client device.

8. The method of claim 1, wherein the operations of receiving the distributed ledger address, transmitting the authentication challenge message, and receiving the response to the challenge message are performed using a network access device as an intermediary for communications between the client device and the authentication server system.

9. The method of claim 8, wherein the authentication server system is a Remote Authentication Dial-In User Service (RADIUS) server and wherein the network access device is a RADIUS client.

10. A non-transitory computer readable medium having instructions stored thereon, that when executed by a processor, perform operations of:
transmitting an authentication challenge message from the authentication server to the client device;
in response to transmitting the authentication challenge message from the authentication server to the client device, receiving at the authentication server, a response to the challenge message including a signature,
wherein the signature is created using a private key to apply a hash function to a randomly generated string, and
wherein the response includes the signature and the randomly generated string; and
using at least the distributed ledger network to determine if the signature used to sign the response to the challenge message is associated with the distributed ledger address transmitted by the client device.

11. The non-transitory computer readable medium of claim 10, wherein using at least the distributed ledger network to determine if the signature used to sign the response to the challenge message is associated with the distributed ledger address transmitted by the client device, comprises: attempting to verify the signature using a public key corresponding to the distributed ledger address, wherein the public key is retrieved from the distributed ledger network.

12. The non-transitory computer readable medium of claim 11, wherein the instructions, when executed by the processor, further perform operations of:
if the signature is verified using the public key, the authentication server system providing the client device access to the network; and
if the signature is not verified using the public key, the authentication server system denying the client device access to the network.

13. The non-transitory computer readable medium of claim 12, wherein the instructions, when executed by the processor, further perform operations of:
receiving a request from the client device to access a network service; and
verifying at the authentication server that credentials provided by the client device during authentication are linked with the distributed ledger address in a smart contract deployed on the distributed ledger network.

14. The non-transitory computer readable medium of claim 13, wherein the instructions, when executed by the processor, further perform operations of: the authentication server system querying the smart contract to determine whether the network access service requested by the client device associated with the credentials and distributed ledger address can be provided to the client device.

15. The non-transitory computer readable medium of claim 14, wherein the smart contract comprises data including an amount of cryptocurrency pledged by a user of the client device, wherein in response to the query from the authentication server system, the smart contract determines whether a sufficient amount of the pledged cryptocurrency is available to provide the requested network access service.

16. The non-transitory computer readable medium of claim 15, wherein the instructions, when executed by the processor, further perform operations of:
the authentication server system querying the smart contract to deduct the amount of cryptocurrency required to provide the requested network access service; and
the authentication server system providing the requested network access service to the client device.

17. A non-transitory computer readable medium having instructions stored thereon, that when executed by a processor, perform operations of:
authenticating a client device using an authentication server system, wherein during authentication, the client device provides user credentials and a distributed ledger address belonging to a user of the client device,
wherein the authentication further comprises a response from the client device with a signature that is created using a private key to apply a hash function to a randomly generated string, and
wherein the response includes the signature and the randomly generated string;
receiving a request at the authentication server system from the authenticated client device to access a network service;
verifying at the authentication server system that credentials provided by the client device during authentication are linked with the distributed ledger address in a smart contract deployed on the distributed ledger network; and
the authentication server system querying the smart contract to determine whether the network access service requested by the client device associated with the credentials and distributed ledger address can be provided to the client device.

18. The non-transitory computer readable medium of claim 17, wherein the smart contract comprises data including an amount of cryptocurrency pledged by a user of the client device, wherein in response to the query from the authentication server system, the smart contract determines whether a sufficient amount of the pledged cryptocurrency is available to provide the requested network access service.

19. The non-transitory computer readable medium of claim 18, wherein the instructions, when executed by the processor, further perform operations of:
the authentication server system querying the smart contract to deduct the amount of cryptocurrency required to provide the requested network access service; and
the authentication server system providing the requested network access service to the client device.

20. The method of claim 1, further comprising:
prior to receiving the distributed ledger address transmitted by the client device, initiating a registration process with the client device, wherein the client device transmits:
a client credential used to identify itself during the authentication process for accessing the network, and
a level of network access service, wherein the level of network access service is selected from a list comprising bandwidth tier or amount of data to access during a given time period.

21. The method of claim 1, wherein the authentication server system is a participant in a blockchain network with the client device permitting the authentication server system to act as a transaction validator for validating authentication requests and authorization requests for service.

22. The method of claim 1, wherein the client device participates with the authentication challenge message absent carrying a transaction on the distributed ledger network.

* * * * *